Oct. 13, 1964 R. H. GOLDBERGER 3,152,793
PROCESS OF UNIFORMLY BLENDING FINELY DIVIDED
CEMENT, SAND AND PIGMENT
Filed May 18, 1961
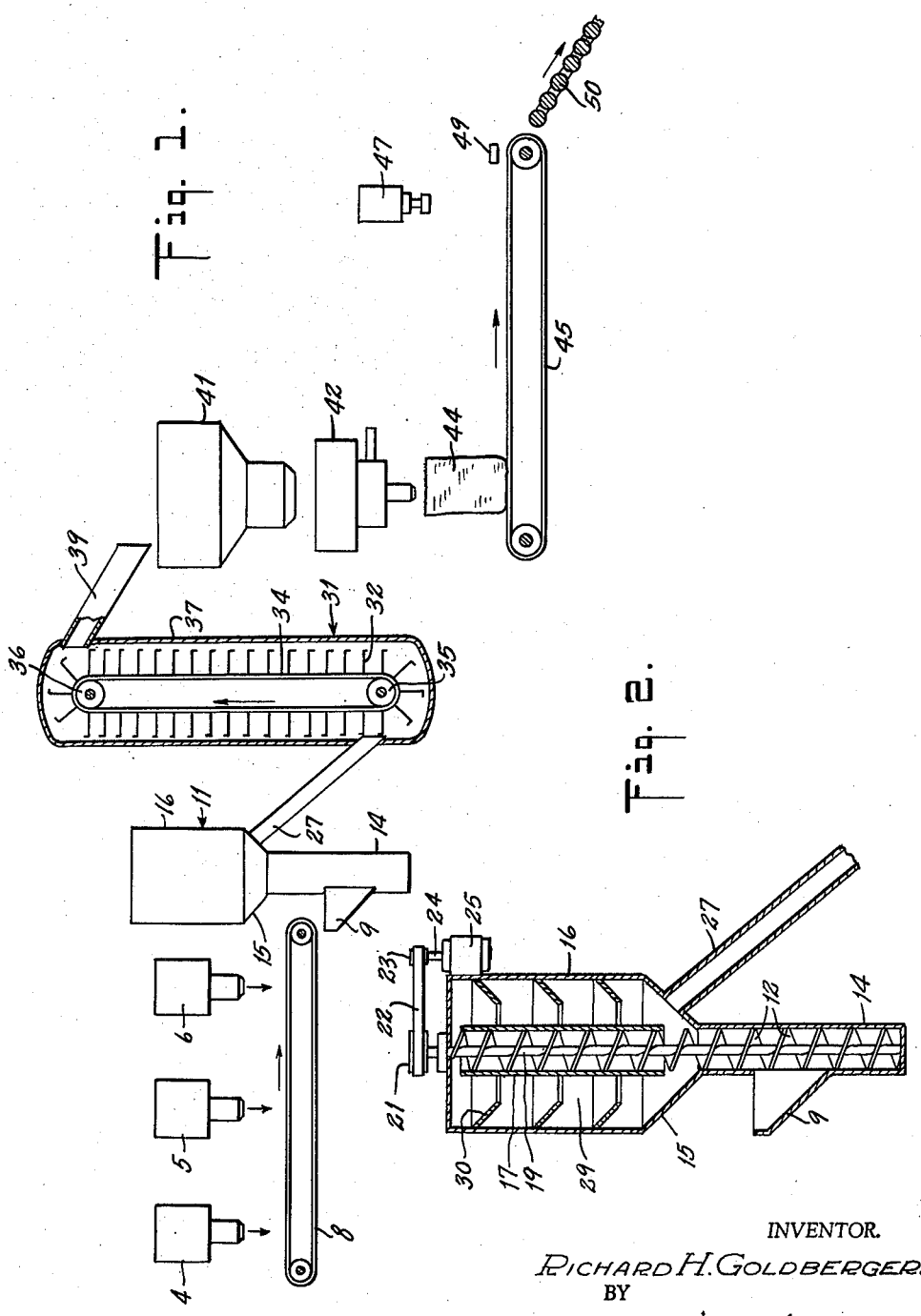
INVENTOR.
RICHARD H. GOLDBERGER.
BY
Ward, Neal, Haselton, Orme & McElhannon
ATTORNEYS

United States Patent Office 3,152,793
Patented Oct. 13, 1964

3,152,793
PROCESS OF UNIFORMLY BLENDING FINELY DIVIDED CEMENT, SAND AND PIGMENT
Richard H. Goldberger, 331-4 Academy Terrace, Linden, N.J.
Filed May 18, 1961, Ser. No. 110,906
2 Claims. (Cl. 259—146)

This invention relates to a system of uniformly mixing or blending finely subdivided materials, and more particularly it is concerned with preparing mixtures of sand and cement in which relatively small quantities of other addition agents are present in a substantially uniform state of distribution.

The greatest problem confronting the manufacturers of packaged mixtures of sand and cement is to obtain a substantially uniform blend. Some latitude in non-uniformity is permissible when the mixture consists only of sand and cement; but in the case of blends in which pigments or other addition agents must be present often in relatively small quantities, the deviation to be tolerable must be small. As a consequence, ready-mixes of cement and sand, while attractive for many reasons, have not been utilized to the maximum extent possible. There has been considerable work done in this field to find an efficient and economical technique for preparing such ready-mixes, but heretofore, to the best of my knowledge, progress has been unsatisfactory. The present invention is concerned with a method by which the disadvantages in conventional methods have been substantially overcome.

Accordingly an object of this invention is to provide a method of obtaining a substantially uniform blend of subdivided solid materials.

Another object of this invention is to provide a ready-mix of sand and cement in which relatively small quantities of addition agents are substantially uniformly distributed throughout the same.

Still another object of this invention is to provide a method of incorporating relatively small quantities of addition agents to sand and cement such that the final mixture is substantially homogeneous in composition.

Other objects and advantages of this invention will become apparent from the following description and explanation thereof.

By means of the present invention, at least two dissimilar subdivided solid materials are passed upwardly in a confined transfer zone, the materials are then introduced into the upper part of a mixing zone, which surrounds the transfer zone in a substantially even manner throughout the cross-sectional area thereof and the resultant mixture or blend is withdrawn from the bottom part of the mixing zone and passed into the transfer zone for recycle into the mixing zone to obtain a substantially homogeneous mixture.

I have found that difficulty mixed subdivided materials such as sand and cement, sand and lime which may also contain relatively small quantities of addition agents, lend themselves in a unique manner to the benefit of this invention. Any combination of subdivided materials which differ from each other in particle size and/or specific gravity, have not been satisfactorily mixed by conventional techniques. Notably, materials which differ from each other in specific gravity by multiples of as much as 1 to 33, more usually about 1 to 10 and/or one of the materials has an average particle size of about 3000 to 5000 times greater than the next smaller sized material, more usually about 400 to 1000 times, are uniquely adapted for processing by means of the present invention. In addition, where the mixtures are also to contain about 0.4 to 6% by weight of at least one addition agent, such as for example, coloring matter, plasticizing agent, bonding agent, entraining agent, waterproofing agent, etc., the present invention is unexpectedly superior over any conventional system.

In general, the main components of the mixtures have average particle sizes of about 20 to 100 mesh and about 20 to 100 microns, respectively, and in the case of sand and cement about 50 mesh and 50 microns. With the aforementioned sizes, it is normally very difficult to procure packaged mixtures which will withstand the normal abuse of handling, not to mention the difficulty which is encountered when incorporating in the mixture other finely divided agents in relatively small quantities. Generally the addition agents have an average particle size of about 2 to 20 microns, more usually about 4 to 6 microns.

The system of the present invention includes a centrally located transfer zone in which the subdivided materials are transported by means, for example, of a screw conveyor to the mixing zone. The transfer zone extends to the upper part of the mixing zone just short of the top of the mixing zone in order that the subdivided materials may be distributed over the cross-sectional area of the mixing zone in a substantially uniform manner. To obtain the mixing efficiency of the present invention, the total mass is fed to the mixing zone at a rate of 300 to 1000 lbs. per hour per square foot of cross-sectional area in the mixing zone, more usually about 600 to 750 lbs. per hour per square foot on the same basis. The mixing zone contains a bed of subdivided material which is about 6 to 10 feet in height, and the bed develops a pressure due to its height, which is sufficient to prevent the upflowing material in the transfer conduit from flowing out through the opening at the bottom of the mixing zone. Actually, the flow is in the reverse direction, in order that the subdivided material can be recycled to the top of the mixing zone. Consequently, the combination of the feed rate, expressed in lbs. per hour of material per square foot of mixing zone and the height of the bed in the mixing zone constitute important aspects of the present invention.

To provide a fuller understanding of the present invention reference will be had to a specific embodiment thereof which is shown in the accompanying drawing wherein:

FIGURE 1 is a schematic diagram of a system whereby mixing and packaging of subdivided material is accomplished; and FIGURE 2 is a cross-sectional diagram of the mixer shown in FIGURE 1.

In FIGURE 1, a cement hopper 4 and sand hoppers 5 and 6 are positioned above a loading conveyor 8 in such a manner that the sand and cement discharged from the hoppers are carried on the conveyor 8. The loading conveyor 8 is a belt-type conveyor of conventional design. Measuring devices are associated with each of the hoppers 4, 5 and 6 to provide for the discharge of predetermined amounts of material onto the loading conveyor 8. In this example, about 500 lbs. of Portland and Masonry cement and 1100 lbs. of sand are discharged onto the conveyor 8. The cement has an average particle size of about 50 microns and the sand has an average particle size of about 50 mesh. The sand and cement also contain about 100 lbs. of polyvinyl acetate resin having an average particle size of about 4 microns, about 5 lbs. of calcium stearate having an average particle size of about 6 microns, about 5 ounces of sodium dodecyl benzene sulphonate having an average particle size of about 5 microns and about 5 lbs. of iron oxide pigment having an average particle size of about 200 mesh.

The total mass on the loading conveyor 8 is fed to a fill hopper 9 of the mixer or blender 11. The blender 11 contains a vertical screw conveyor 12 which extends the full height of the same. The bottom part of the screw conveyor 12 is housed in a cylindrical casing 14 which has an opening where the fill hopper 9 is situated for receiving the finely divided solids to be blended. The casing 14 is joined at its upper end to a frusto conical or funnel-shaped section 15. An enlarged cylindrical section 16 superimposes the funnel shaped part 15 and comprises the outer shell of the mixing zone 29. Within the enlarged section 16 is positioned concentrically a collar 17 which circumscribes the screw conveyor 12. The collar 17 does not extend to the top of the enlarged section 16 nor does it join with the funnel section 15. The screw conveyor 12 is mounted on a vertical shaft 19 which has its ends rotatably mounted at the opposite ends of the blender 11. At the upper end, the shaft 19 is connected to a pulley 21, which in turn is driven by a belt 22. The belt 22 is mounted on a driver pulley 23, which is positioned on the shaft 24 of a motor 25. A discharge spout 27 desirably positioned 90° from the fill hopper 9 is connected to the funnel section 15 of the blender 11. To facilitate admixing within the mixing zone 29, baffles 30 are spaced longitudinally on the inside wall of the enlarged section 16.

After the mass has been in the blender for about 2 minutes, determined as average hold-up or residence time, it is discharged from the blender 11 through spout 27 and fed into a bucket elevator system 31. The bucket elevator consists of a series of buckets of the same type as bucket 32 mounted on a vertically positioned endless belt 34, which is mounted on the vertical spaced rollers 35 and 36. The buckets are enclosed within a casing 37. At the upper end of the elevator 31 is positioned a discharge spout 39, which serves to direct the outgoing mixture into a surge bin 41.

The mixture in the surge bin 41 is now ready for weighing and packaging in bags. The mixture flows from the surge bin 41 to a weigh hopper 42. The appropriate weight is discharged from the hopper 42 into a bag 44. The bag is positioned on an endless belt conveyor 45 which transports bags of the type designated by numeral 44 to a sealer 47. After being sealed, the bags are tripped by means of a guide 49 and carried on a roller ramp 50, where they are handled manually for shipment.

With respect to a preferred embodiment of the blender, the enlarged section 16 has a diameter of 6 feet and the collar 17 has an external diameter of 15 inches. The collar 17 terminates at a point which is about 6 inches from the top of the blender 11. Similarly, the collar 17 is about 6 inches above the funnel section 15. In the annular or mixing zone 29, the subdivided material has a bed height of about 8 feet. The speed of the screw conveyor 12 is such as to transport the material upwardly at a rate of about 500 lbs. per minute, but inside the collar 17, the flow rate is about 800–1000 lbs. per minute to accommodate recirculation of the material to and from the mixing zone. As a result of mixing in the blender 11, the final product is homogeneous in color and all ingredients are substantially uniformly blended.

I claim:

1. A solids blending process which comprises introducing finely divided cement of an average particle size of about 50 to 100 microns and finely divided sand having an average particle size of about 40 to 70 mesh into a transfer zone, passing the mixture of sand and cement upwardly in the transfer zone and discharging the same substantially evenly over the cross sectional area of a mixing zone which surrounds the transfer zone, blending said mixture of sand and cement in said mixing zone by passing said mixture past baffles spaced longitudinally on the inside wall of said mixing zone, withdrawing the so blended sand and cement from the lower portion of the mixing zone and passing the same to the transfer zone for recirculation to the upper portion of the mixing zone, the feed rate of material to the mixing zone being about 800 to 1000 lbs. per hour per square foot of cross sectional area therein, the material in said mixing zone having a bed height of about 6 to 10 feet and a residence time therein of about two (2) to three (3) minutes.

2. The process of claim 1 wherein finely divided pigment of an average particle size of about 20 to 200 mesh is also introduced along with the sand and cement in amounts between about 0.2–1%.

References Cited in the file of this patent
UNITED STATES PATENTS

| | | |
|---|---|---|
| 2,731,248 | Fisher | Jan. 17, 1956 |
| 2,735,661 | Patterson | Feb. 21, 1956 |
| 2,825,511 | Byberg | Mar. 4, 1958 |
| 2,864,593 | Shoup | Dec. 16, 1958 |